UNITED STATES PATENT OFFICE.

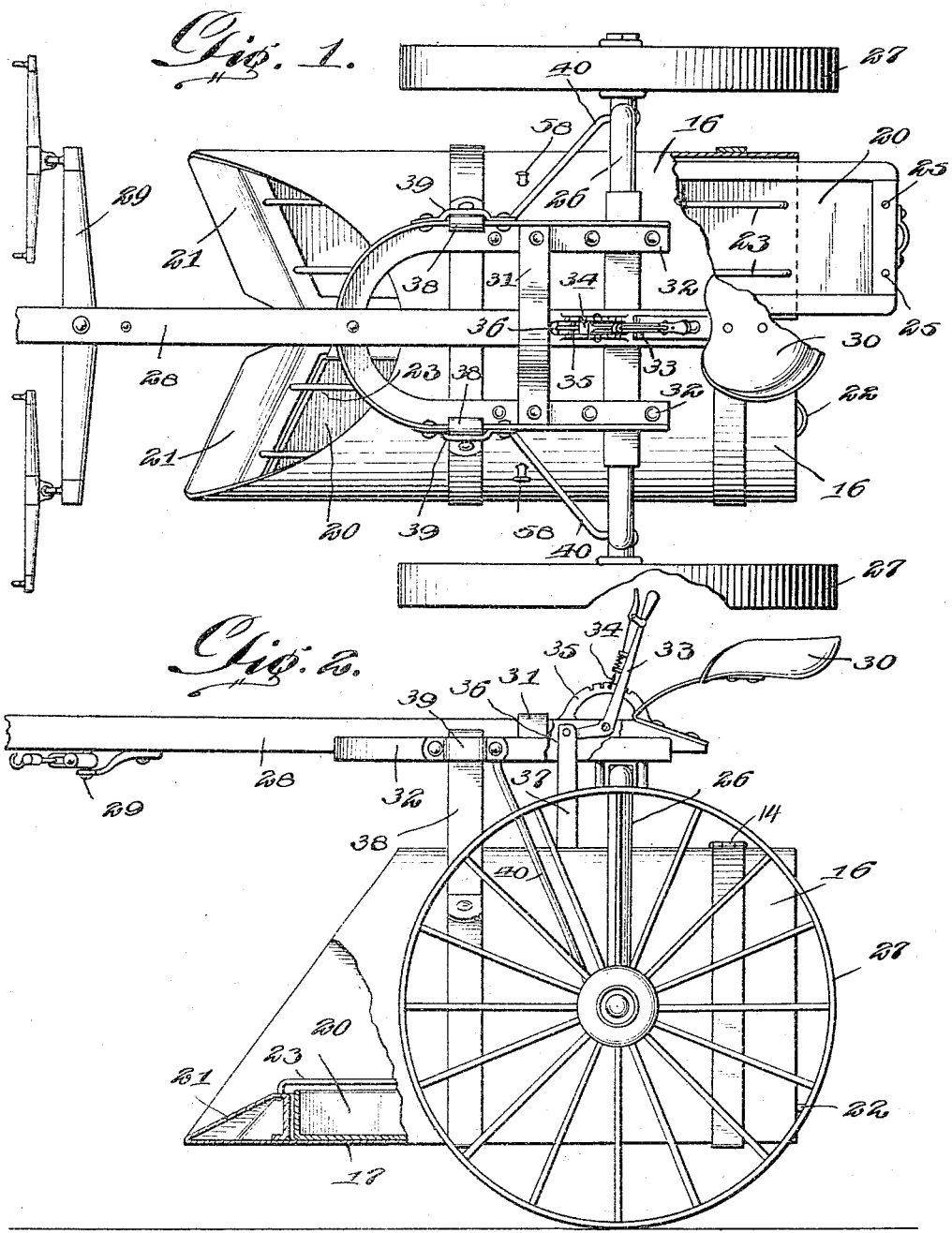

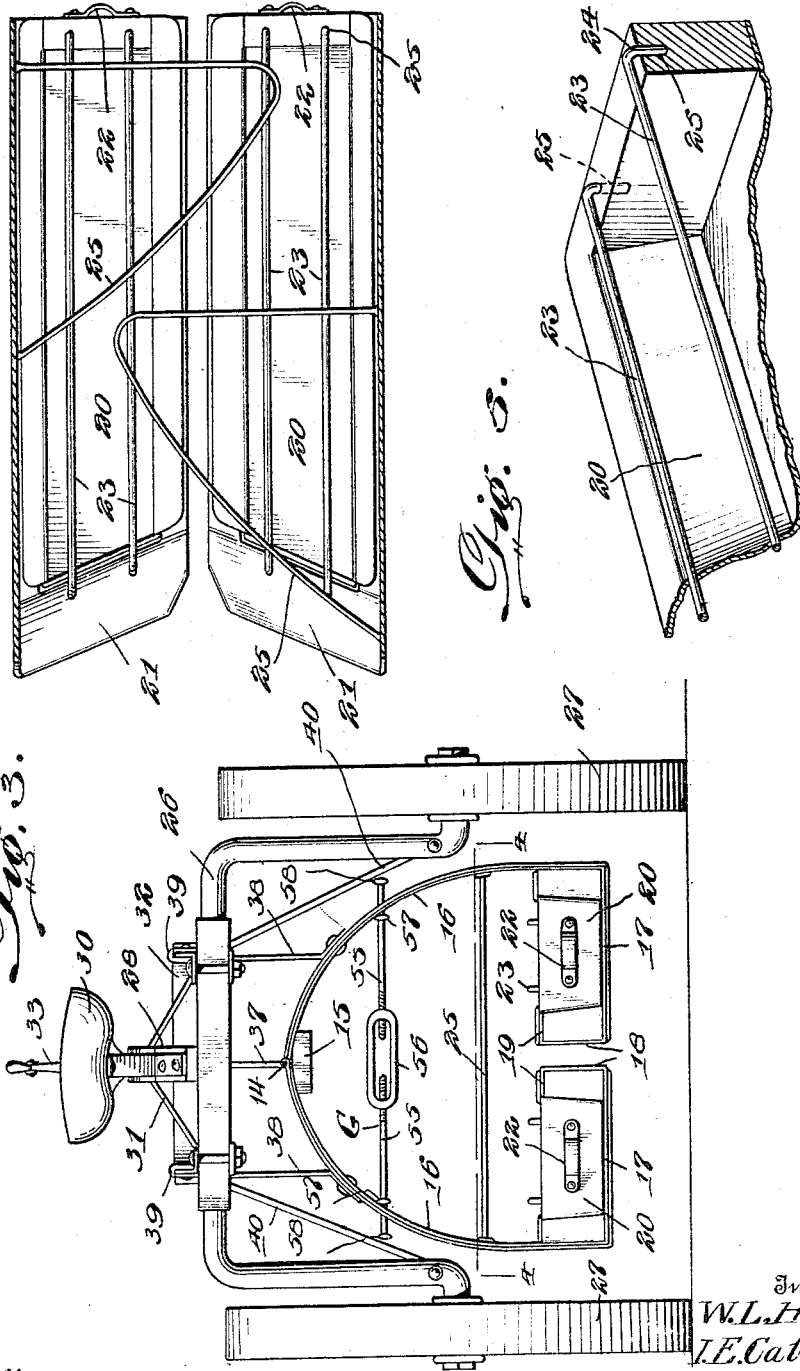

WILLIAM L. HENRY AND IRVEN E. CALLOWAY, OF PLEHWEVILLE, TEXAS.

BOLL-WEEVIL DESTROYER.

1,235,473. Specification of Letters Patent. Patented July 31, 1917.

Application filed December 1, 1916. Serial No. 134,418.

*To all whom it may concern:*

Be it known that we, WILLIAM L. HENRY and IRVEN E. CALLOWAY, citizens of the United States, residing at Plehweville, in the county of Mason and State of Texas, have invented new and useful Improvements in Boll-Weevil Destroyers, of which the following is a specification.

This invention relates to machines or devices for catching and destroying boll weevils and other noxious insects, and it has particular reference to that type of machines in which is included a shield to extend over the row of plants that is to be operated upon, receptacles carried by said shields to contain an insect exterminating liquid, and beaters to agitate the plants so as to cause the insects and punctured leaves and squares to drop into the receptacles or liquid containers, the whole being adjustably mounted on a wheeled carrying frame.

The present invention has for its object to simplify and improve the general construction and arrangement of the constituent parts of the device, special reference being had to the receptacles or liquid containers which are in the form of drawers slidably mounted on suitable supports and equipped with guard rods serving also to lock the drawers securely in position for operation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a machine constructed in accordance with the invention.

Fig. 2 is a side elevation of the same, partly in longitudinal section.

Fig. 3 is a rear elevation.

Fig. 4 is a horizontal sectional view taken on the line 4—4 in Fig. 3, and showing one of the receptacles or drawers partly withdrawn from its initial position.

Fig. 5 is a detail view partly in perspective and partly in section showing one of the drawers and the locking means therefor.

Corresponding parts in the several figures are denoted by like characters of reference.

The improved device comprises a longitudinally disposed ridge member 15 with which are hingedly connected two curved side members or shields 16, as best seen at 14 in Fig. 3 and also in Fig. 2, said shields being provided at their lower ends with inturned portions 17 having upstanding side members 18 provided at their top edges with longitudinal flanges 19, said shields, bottom portions, upstanding side portions and flanges combining to constitute supports for the drawers or receptacles 20 which are fitted to slide lengthwise in said supports. The bottom portions 17 of the supports are provided at their forward ends with beveled guides 21 which also constitute stops to limit the forward movement of the drawers, said drawers being provided at their rearward ends with handles 22 by means of which they may be conveniently withdrawn from the supports in a rearward direction. Securely connected with the guides 21 are the forward ends of guard rods 23, said guard rods extending longitudinally of the drawers above the latter, and said rods being provided at their rearward ends with hooks 24 adapted for detachable engagement with eyes or recesses 25 at the rearward ends of the drawers. When thus engaged, the guard rods will constitute locking means, whereby the withdrawal or removal of the drawers will be prevented. Said guard rods also serve, when the machine is in operation, to prevent the leaves of the plants that are being operated upon from switching downwardly into the drawers which constitute receptacles in which crude oil or other insecticide liquid may be placed.

The shields 16 are provided with beaters 25 that extend inwardly from said shields above the drawers, as best seen in Fig. 4. Said shields are also connected together near their upper ends by means of a spacing member or gage rod G, the same being composed of two threaded rods 55 connected together at their inner ends by a turn buckle 56 and terminally provided at their outer ends with stop members 57 and 58 engaging respectively the inner and outer faces of the shields, thereby limiting the swinging movement of said shields in the direction of each other as well as outwardly from each other, and enabling the shields to be variously spaced apart by manipulation of the turn buckle 56. The latter, by operating the turn buckle, may be spread apart or drawn together, as may be required.

The entire device in operation is suspended from a carrying frame embodying an arched axle 26 having ground wheels 27 and with which a tongue 28 is suitably connected, said tongue having a draft attachment, such as an evener 29 of ordinary construction. The tongue 28 supports a seat 30, and said tongue has a cross bar 31 which assists in supporting the side bars 32 of the frame. Fulcrumed in a convenient position on the tongue is a hand lever 33 provided with upwardly and downwardly extending arms, the upwardly extending arm being equipped with a stop member 34 engaging a rack segment 35, whereby the said lever and related parts may be maintained in position at various adjustments. The downwardly extending arm of the lever operates in a slot 36 in the tongue, and said arm is connected with an arm 37 extending upwardly from the ridge member 15 which latter, together with the shields and the liquid receptacles, will be suspended beneath the tongue and between the limbs of the arched axle. The shields 16 are provided each with an upwardly extending hook member 38 guided in a keeper 39 on one of the side bars 32, said hook members permitting the shields to be freely raised or lifted, but limiting the downward movement of said shields and related parts by engagement with the top edges of the side bars. It is also obvious that the said bars 38 should engage the keepers 39 so loosely as not to interfere with the swinging movement of the shields or side members 16 about the axes of the hinges 14, said swinging movement being limited and regulated by the means hereinbefore described. Braces 40 connect the side bars 32 with the axle spindles on which the ground wheels are journaled, thereby sustaining the axle in constant position with respect to the side bars of the frame.

From the foregoing description, taken in connection with the drawings hereto annexed, the operation and advantages of this invention will be readily understood. The machine may be drawn by a team of draft animals walking at opposite sides of the row of plants, the stems of which are guided between the liquid receptacles in which crude oil or a mixture of kerosene and water or other insecticide has been placed. The foliage of the plants will be agitated by the beaters 25, causing the weevils or other insects to be dislodged, as well as the punctured squares and leaves, the same dropping into the liquid receptacles which is destructive to the life of the insects and their progeny. The contents may be subsequently discharged from the drawers which may be readily removed by first disengaging the hooks 24 from the eyes 25, and the contents may then be burned or otherwise disposed of. The removable drawers may be readily emptied and cleansed, and afterward replaced for a repetition of the operation.

Having thus described the invention, what is claimed as new, is:—

1. In a device of the class described, a carrying frame, a ridge beam, shields hingedly connected with the ridge beam, liquid receptacles carried by the shields, and means for supporting and adjusting the ridge beam with respect to the carrying frame, said frame having side members provided with keepers and the shields having upwardly extending hook members guided in the keepers and adapted for engagement with the upper edges of the frame bars.

2. In a device of the class described, a wheeled carrying frame, a ridge beam, shields hingedly connected with the ridge beam and having drawer supports at their lower ends, said drawer supports being provided with beveled guides at their forward ends, drawers engaging the supports and constituting liquid receptacles, guard rods connected with the beveled guides, and means for connecting the guard rods with the drawers to secure the latter in position on their respective supports; and means for supporting and adjusting the ridge beam with respect to the carrying frame.

3. In a device of the class described, hingedly supported shields having drawer supports provided with beveled guides at their forward ends, drawers slidable on the supports, guard rods connected with the beveled guides and having hooks at their rearward ends and eyes or recesses in the drawers adapted to be engaged by the hooks.

In testimony whereof we affix our signatures.

WILLIAM L. HENRY.
IRVEN E. CALLOWAY.

Copies of this patent may be obtained for five cents each, by addressing the "Commissioner of Patents, Washington, D. C."